United States Patent
Vogt

(10) Patent No.: US 7,087,131 B1
(45) Date of Patent: Aug. 8, 2006

(54) METHOD AND DEVICE FOR PRODUCING CARD-LIKE INFORMATION CARRIERS

(75) Inventor: Werner Vogt, Remetschwil (CH)

(73) Assignee: Interlock AG, Schlieren (CH)

( * ) Notice: Subject to any disclaimer, the term of this patent is extended or adjusted under 35 U.S.C. 154(b) by 0 days.

(21) Appl. No.: 09/786,045

(22) PCT Filed: Aug. 27, 1999

(86) PCT No.: PCT/IB99/01560

§ 371 (c)(1),
(2), (4) Date: Feb. 28, 2001

(87) PCT Pub. No.: WO00/12308

PCT Pub. Date: Mar. 9, 2000

(30) Foreign Application Priority Data

Aug. 29, 1998 (DE) ................................ 198 39 517

(51) Int. Cl.
*B29C 65/18* (2006.01)
*B32B 37/18* (2006.01)

(52) U.S. Cl. ...................... 156/228; 156/300; 156/299; 156/583.2; 156/583.1

(58) Field of Classification Search ............. 156/583.1, 156/583.2, 563, 559, 299, 300, 381, 303.1, 156/312, 581, 228; 100/305, 315, 316, 317, 100/318, 319, 321, 322
See application file for complete search history.

(56) References Cited

U.S. PATENT DOCUMENTS

| | | | | |
|---|---|---|---|---|
| 3,551,952 A | * | 1/1971 | Morse | ......................... 100/321 |
| 4,659,304 A | | 4/1987 | Day | |
| 4,675,066 A | * | 6/1987 | Honda | ......................... 100/324 |
| 5,399,223 A | * | 3/1995 | Vogt | ........................... 156/285 |
| 5,468,315 A | | 11/1995 | Okada et al. | |

FOREIGN PATENT DOCUMENTS

| | | |
|---|---|---|
| DE | 30 01 172 | 7/1981 |
| DE | 31 38 857 | 4/1983 |
| DE | 39 16 708 | 11/1990 |
| DE | 41 18 814 | 12/1991 |
| DE | 92 18 985 | 12/1996 |
| EP | 669 214 | 8/1995 |
| JP | XP-002128554 | 3/1984 |

OTHER PUBLICATIONS

Translation of DE 92 18 985 U1 (submitted in Feb. 28, 2001 IDS).*

* cited by examiner

*Primary Examiner*—George Koch
(74) *Attorney, Agent, or Firm*—Wolff & Samson PC; Klaus P. Stoffel

(57) ABSTRACT

A method for producing information carriers in the form of cards, in particular credit cards, passes, identification cards, admittance cards etc., the laminating process including placing at least one card template which is to be sized, preferably a laminate consisting of a plurality of sized card layers, into a hollow mold and subjecting it to a simultaneous action of pressure and heat for a predetermined time. The material placed into the hollow mold is heated over at least one large area, as known per se by the use of heating plates, and in the peripheral, narrow, outer boundary region of the inserted material quantities of heat flowing off per se there are retained, blocked in, reflected and concentrated back onto the laminate template.

9 Claims, 1 Drawing Sheet

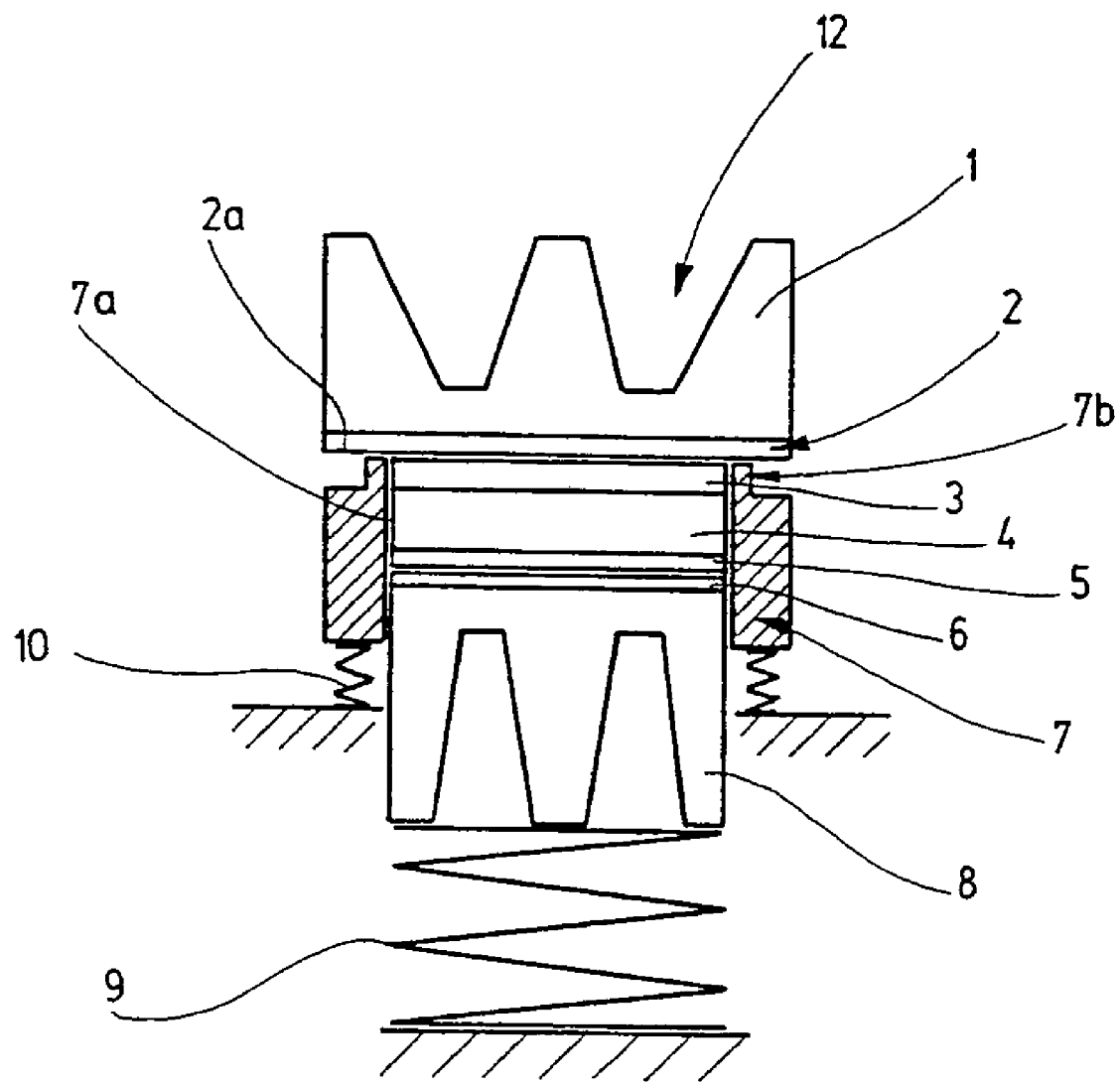

METHOD AND DEVICE FOR PRODUCING CARD-LIKE INFORMATION CARRIERS

PRIORITY CLAIM

This is a U.S. national stage of application No. PCT/IB99/01560, filed on Aug. 27, 1999. Priority is claimed on that application and on the following application:
Country: Germany, Application No.: 198 39 517.5, Filed: Aug. 29, 1998.

BACKGROUND OF THE INVENTION

Two types of laminators which are suitable for producing plastic cards consisting of layers (laminate) by laminating, i.e. bonding together the layers, are known.

A first group works with oversized laminate layers which are placed between two heating plates and are laminated by a conventionally simultaneous action of heat and pressure. The non-defined boundaries of the finished laminate mean that in a second processing step after cooling said laminate then also has to be cut, namely punched, to the final dimensions of the card.

A second group for laminating or heat sealing suitable plastic cards comprises a hollow mold or cavity which holds the laminate to be laminated and straight away has the final dimensions of the card, and heating plates which are arranged above and below the cavity into which, as is known, cooling bodies are in turn assigned, and also pressure-exerting means which press the heating plates onto one another in such a manner that a laminate held between them is subjected to an appropriately dimensioned action of pressure and temperature for the short period of action. A finished card is therefore immediately produced, the laminating always taking place until shortly before or at the softening point of the inserted material to a sufficient extent that an integral, finished card can be removed from the cavity.

Laminators of this type from the second group, as are revealed, for example, in the specifications DE 39 16 708 A1, DE 42 06 342 A1 or EU 0 669 214 A1, have a peripheral frame which bounds the receiving cavity and whose internal dimensions correspond to the final dimensions of the card thereby rendering the subsequent punching processing step superfluous. Laminators of this type which produce a finished, sized card and which are also referred to in the following as sizing laminators, generally also have a pressure-compensating body so as to ensure a uniform surface structure of the finished card and, in particular, also a uniform action of pressure during the laminating process.

However, the fact that the borders of the inserted laminate layers necessarily bear against the sized mold parts during the laminating process and therefore a loss of heat inevitably also occurs in these regions, so that although a uniform action of pressure can be spoken of, this type of heat sealing, i.e. laminating, does not succeed in also ensuring a uniform action of heat in all regions of the inserted material which is to be laminated, may be problematical in sizing laminators of this type.

The reason for this resides in the fact that only the heating plates on both sides have final dimensions, with the result that, when viewed purely physically, said heating plates necessarily already have a certain temperature gradient from the center to the boundary regions. However, this problem could be countered by an appropriately suitable distribution of the heating means—but what cannot be rectified in this manner, particularly if the shortness of the laminating time over which the action of pressure and temperature is maintained on the inserted laminate is included, is the fact that the boundary regions of the inserted material which is to be laminated which are pressed against the lateral, sized mold parts or come to bear against the latter lose heat in this region, with the result that the uniform distribution of the acting quantities of heat which is required over the entire surface of the laminate for a uniform laminating process cannot be ensured.

This means that the laminating possibly, or even with some degree of probability, does not take place completely, especially in the boundary region of the card, with the result that the layers which are to be bonded together may be broken open again from that point, for example for forgery purposes. This circumstance can also not be countered by simply heating more intensively overall, since this leads to excessive heating of the laminate in the central region, with the result that an undesirable fusing together of the material and possibly even of any information, data and the like which is present could occur. Such a measure would also not be conducive for inserted electronic parts.

SUMMARY OF THE INVENTION

The invention is therefore based on the object of providing a remedy for this and also of ensuring a uniform laminating process including the boundary regions of the card in such laminators which are sized by way of their mold parts.

The method according to the invention achieves this object by avoiding the discharge of heat energy in the boundary regions of the cavity of the laminator or, which is synonymous therewith, by maintaining and, as it were, concentrating the heat back through the mold onto the inserted card which is to be laminated or onto the laminate, it is ensured that said mold reaches the precise softening temperature required for the laminating process in the boundary regions at the same time as in the central region. This not only results in an elegant appearance of the entire finished product over its entire surface, but also in the certainty that the layers of the laminate which are to be laminated to one another are also satisfactorily connected to one another especially in the boundary region and that when an individual layer is inserted, the boundary region thereof obtains the same degree of lamination as the central region.

Such a result can be achieved in differing ways, for example by the mold having a peripheral, preferably also completely closed, frame made of a suitable material which conducts heat with difficulty or poorly, where the frame simultaneously forms, by means of its internal dimensions, the mold cavity for the laminate to be received. Such a frame may, for example, consist of a plastic which conducts heat poorly or very poorly, for example glass fiber reinforced epoxy resin; however, it may also have a suitable sandwich construction having an internal coating which conducts heat with difficulty, or it may consist entirely, for example, of a material, such as ceramic or other insulator material.

Appropriately designing the upper and outer heating plates to include the heat-deflecting properties of the frame of a sizing laminator of this type then enables the inserted laminate to be uniformly and completely laminated over its entire surface and therefore including its boundary regions.

BRIEF DESCRIPTION OF THE DRAWING

The drawing shows in a cross-sectional diagram one possible construction of a laminator together with inserted card components and a heat-insulating mold frame.

DETAILED DESCRIPTION OF THE PREFERRED EMBODIMENTS

The basic concept of the present invention resides in designing the cavity of a sizing laminator in such a manner that during the laminating process, i.e., for example, during the bonding together of a plurality of inserted card laminate layers or the laminating of an individual, thick plastic layer, the boundary regions of the card manufactured to this extent to size are able to make full use for the laminating process of the heat energy supplied to the heating plates, i.e. heat is prevented from being discharged via the boundary regions and the mold parts which are necessarily present there and are used as a bearing. For this purpose, a material which conducts heat very poorly is preferably provided for a frame forming the boundaries of the cavity, with the result that the quantity of heat which is supplied remains within the cavity and a satisfactory laminating process of the inserted material (laminate) is ensured at all locations.

In the attached drawing, the sizing laminator is denoted by 12 and comprises an upper heating plate 2 and a lower heating plate 6 which, in conjunction with a frame 7, form a cavity which is used for holding the material to be laminated.

This material to be laminated usually concerns ready-sized card layers, preferably PVC layers, for a card to be laminated, which layers form a laminate and are therefore inserted as a stack comprising the layers 3, 4 and 5 into the hollowed space of the mold, i.e. the cavity of the laminator.

It can furthermore be seen that in order to apply the required pressure in the case of the exemplary embodiment illustrated in the drawing of a laminator 12, the lower heating plate 6 corresponds with the greatest possible accuracy to the internal dimensions of the frame 7 and therefore also to the final dimensions of the card which is to be produced, with the result that this heating plate can be inserted, from below in this case, into the cavity 7a which is formed by the hollow space of the frame 7.

Since, in order to carry out a correct laminating process, i.e. initially rapid feeding in of the required quantities of heat under pressure for the laminating process and then just as rapid dissipation of the heat so that the product which is produced can be removed in solid form from the laminator, the two heating plates 2 and 6 bear cooling bodies 1 and 8 on the side which faces away from the cavity, the lower cooling body 8 here also has approximately the dimensions of the card in order likewise to be able to be inserted into the cavity.

In the exemplary embodiment illustrated, the pressure required for the laminating process is applied via the lower heating plate 6 in conjunction with the feeding in of heat, with the result that appropriate, pressure-producing means, indicated in the drawing as a prestressing spring 9 representing all other options, act on the lower cooling body 8.

The upper cooling body 2 overlaps the frame 7 preferably on all sides by way of a lip 2a projecting all around, with the result that it rests, as it were, as a lid on the frame 7, in which case, with stationary positioning of the upper heating plate 2 together with the assigned cooling body 1, the frame 7 can be mounted in a moveable manner and is pressed by dedicated prestressing means 10 by an appropriate pressure from below against the upper heating plate 2. This firm bearing and boundary-side overlapping of the frame structure by the cooling-body lip 2a ensure that at least on the upper surface of the finished card a satisfactory, also visually attractive lamination is obtained together with a precise boundary edge for the card which is produced to size. Of course, in this completed version this is not possible for the lower boundary-edge corner region of the card, since the laminating pressure has to be applied and, for this purpose, the lower heating plate 6 has to have a clearance, even if only very slight, from the inside dimensions of the frame in order to enable it to be able to be moved relative to the frame 7.

The frame 7 itself consists of a material which conducts heat only slightly or only very slightly or is provided, at least on its inner surface, i.e. on the regions facing the laminate to be laminated, with a coating which conducts heat with appropriate difficulty. For better understanding, in the graphical illustration the inserted laminate of the card which consists of the three layers 3, 4 and 5 is illustrated excessively thickly; however, in every case the material flows and fuses together, with the result that the hollow space of the mold or the cavity of the laminator is completely filled by the card material or the laminate during the laminating process.

The frame characteristics of conducting heat poorly, deflecting heat, reflecting heat and of concentrating the quantity of heat transferred from the heating bodies to the inserted laminate back onto the laminate means that during the laminating process, which is actually usually finished in seconds, there is no significant transfer of heat energy from the cavity or by the laminate material or card material to the inner sized mold wall of the frame 7, with the result that uniform heating and uniform bonding, i.e. laminating, of all of the layers of the card is ensured with a satisfactory, external appearance also being obtained.

As the drawing illustrates, in the overlapping region of the upper heating plate 2 the frame 7 can have a peripheral incision or an external recess 7b by means of which the frame mass is clearly smaller at the point where the laminating process takes place after the inserted laminate has been compressed, with the result that, for example, the heat absorption of the frame is thereby also reduced, in addition to its heat-deflecting, reflecting or heat-insulating characteristics.

However, the main reason for this reduction in material is the increase obtained by this means in the specific pressure exerted by the prestressing means 10 between the upper heating plate and the upper frame boundary edge, which abuts from below against the heating plate, at given pressure values. Particularly good sealing of the cavity at this location and a clean, highly precise mold border are obtained in this manner. This is of importance for the fusing together of the laminate material which takes place in this region, resulting here in a clean, cut-like boundary-edge transition for the finished edge. It is therefore also recommended to grind the edge transition finely in a similar manner to a flat piston ring.

Furthermore, it may be expedient to select for the prestressing means 10 for the frame a support against the lower cooling body, since the higher the pressure which is exerted by the heating plates, the higher the frame pressure (against the upper heating plate) also has to be so as to avoid the material fusing together in the transitional boundary-edge region.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

The invention claimed is:

1. A method for producing a card-shaped information carrier, comprising the steps of: placing at least one card template which is to be sized into a hollow mold; subjecting the template to a simultaneous action of pressure and heat for a predetermined time so that the template placed into the hollow mold is heated over at least one large area by heating plates; and enclosing a peripheral, narrow, outer boundary region of the inserted template with a peripheral frame consisting of a material which is one of substantially non-heat-conducting and reflects heat and also concentrates heat back onto an inserted laminate, the frame having internal dimensions that correspond to final dimensions of the card-shaped carrier, so that quantities of heat flowing off per se there are retained, blocked in, reflected and concentrated back onto the template, wherein the enclosing step includes enclosing the peripheral, narrow, outer boundary region of the inserted template with a peripheral frame having a reduction in material in a transitional edge region in order to increase specific contact pressure between a frame border edge and the upper heating plate.

2. An apparatus for producing a sized, card-shaped information carrier comprising a frame defining a cavity in which card layers are placeable for lamination by pressure and heat, a peripheral region of the frame consisting of a material which is one of substantially non-heat-conducting, reflects heat and concentrates heat back onto an inserted laminate, the frame having internal dimensions that correspond to final dimensions of the card-shaped carrier, and further comprising heating plates arranged on both sides of the frame forming, by its internal dimensions, the cavity for the laminating process, the heating plates including an upper heating plate and a lower heating plate, the frame having a reduction in material in a transitional edge region in order to increase specific contact pressure between frame border edge and the upper heating plate, one of the heating plates having external dimensions that correspond to the internal dimensions of the frame and being insertable with a prestressing action into said frame so as to produce the pressure required for laminating.

3. An apparatus as defined in claim 2, wherein the lower heating plate has the external dimensions that correspond to the internal dimensions of the frame, and further comprising a cooling body adjacent to the lower heating plate so that the cooling body is insertable together with the lower heating plate into the frame.

4. An apparatus as defined in claim 3, and further comprising prestressing means for prestressingly acting on the cooling body adjacent to the lower heating plate.

5. An apparatus as defined in claim 3, wherein the upper heating plate is arranged to close the cavity formed by the frame in a lid-like manner by way of a boundary lip projecting over the frame dimensions.

6. An apparatus as defined in claim 5, and further comprising pressure-producing means for pressing the frame and the upper heating plate firmly against one another so that between the upper heating plate, which closes the cavity in a lid-like manner, and the frame an intrinsic relative movement is possible.

7. An apparatus as defined in claim 5, and further comprising dedicated prestressing means for pressing a transitional boundary edge of the frame against the boundary lip of the upper heating plate.

8. An apparatus as defined in claim 7, wherein the frame prestressing means are supported on the cooling body which is assigned to the lower heating plate and subjects the lower heating plate to pressure.

9. An apparatus as defined in claim 2, wherein the reduction in material is formed by a peripheral, outer annular recess in the frame.

* * * * *